3,644,579
TRANSPARENT THERMOPLASTIC RESIN HAVING HIGH IMPACT STRENGTH

Masaki Nakajima, Yokohama-shi, Tadayuki Hosogane, Kawasaki-shi, Shoichi Kobayashi, Tokyo, and Shigenobu Ishihara, Fujiwasa-shi, Japan, assignors to Showa Denko Kabushiki Kaisha, Tokyo, Japan
No Drawing. Filed May 28, 1969, Ser. No. 828,700
Claims priority, application Japan, Jan. 7, 1969, 44/1,165
Int. Cl. C08f 19/10, 41/12
U.S. Cl. 260—876 R    6 Claims

ABSTRACT OF THE DISCLOSURE

A thermoplastic resin having high transparency and impact-strength comprising the components of chlorinated polyethylene, methylmethacrylate and styrene, and a process for producing the same.

---

This invention relates to a new thermoplastic resin which, being composed of either the three components of chlorinated polyethylene, methyl methacrylate and styrene or the four or five components consisting of the foregoing three components to which have been further added an alkyl acrylate and/or alpha-methylstyrene, excels in its transparency, impact strength, weatherability, flame resistance and various other mechanical strengths. The invention also relates to a process for producing the foregoing resin.

The possession of impact strength, weatherability, flame resistance and various mechanical strengths in the case of the thermoplastic resins used for making furnitures, appliances and other shaped articles and for use as building materials is an important requirement. In addition, it is very desirable that the resin possesses transparency, since it then can find a much wider application as a resin for molding use. However, it has been practically impossible to date to obtain a thermoplastic resin which conjointly possesses good transparency, impact resistance and mechanical strengths.

Heretofore, the so-called ABS resin (a three-component resin composed of acrylonitrile, butadiene and styrene) has been known as being typical of the thermoplastic resins possessing outstanding impact strength. However, this resin is opaque and, in addition, its weatherability and flame resistance are also not necessarily satisfactory. Further, the so-called ACS resin (a three-component resin composed of acrylonitrile, chlorinated polyethylene and styrene) is disclosed in U.S. application Ser. No. 339,899, filed Jan. 24, 1964, now U.S. Pat. No. 3,496,215, and continuation-in-part application Ser. No. 784,517, filed Nov. 22, 1968 and German patent application P 15 20 850.1, filed Feb. 7, 1964. While this ACS resin is superior to the ABS resin in its impact strength, weatherability and flame resistance, it lacks transparency.

On the other hand, as transparent thermoplastic resins, known are the so-called MBS resin (a three-component resin composed of methyl methacrylate, butadiene and styrene) and the so-called transparent ABS resin (a four-component resin composed of methyl methacrylate, acrylonitrile, butadiene and styrene). These resins excel in their transparency, and their impact strength is also high, but their weatherability and flame resistance are poor.

The heretofore known thermoplastic resins, inclusive of the typical resins which have been given above, all possess certain special features but, on the other hand, have some defects. Hence, none possess conjointly all the hereinbefore indicated traits that are required of a resin to qualify it as a desirable resin for molding purposes.

The present invention provides a thermoplastic resin which excels in impact strength, weatherability and flame resistance as well as possesses good to outstanding transparency. Further, this resin does not possess the unsatisfactory processability which is frequently seen in the case of the conventional impact-resistant resins and thus can be readily worked. The thermoplastic resin of this invention is composed of three to five components: the three principal components of methyl methacrylate, chlorinated polyethylene and styrene to which is further added a small quantity of a lower alkyl alkylate and/or alpha-methylstyrene. The invention resin could well be called an "MCS resin" on the basis of the foregoing three principal components. The present invention will be more fully described below.

In producing the invention resin, the following components (A) and (B) which are to be used as the starting materials, are first readied.

(A) 5–50 parts by weight of chlorinated polyethylene having a degree of chlorination of 15–50% by weight, and (B) 95–50 parts by weight of a mixture of monomers comprising (a) 55–85% of methyl methacrylate which contains 0–20% of a lower alkyl acrylate, and (b) 45–15% of styrene which contains 0–15% of alpha-methylstyrene, said percentage of each monomer being based on the total weight of said mixture of monomers.

The foregoing starting materials are submitted to any one of the following procedures (1), (2) or (3):

(1) A procedure which comprises graft-polymerizing the total amount of said (A) component with the total amount of said (B) component to form an interpolymer of them, and recovering the same.

(2) A procedure according to the aforesaid (1) wherein the graft-polymerization reaction is effected in two stages: the first stage being conducted using the total amount of said (A) and 30–80% by weight of the total amount of said (B) component to form a prepolymer, followed by the second stage in which the remaining 70–20% by weight of the total amount of said (B) component is polymerized in the presence of said prepolymer, and recovering the thus formed polymer composition.

(3) A procedure which comprises graft-polymerizing the total amount of said (A) component with 30–80% by weight of the total amount of said (B) component to form a prepolymer, polymerizing the remaining 70–20% by weight of the total amount of said (B) component in the absence of said prepolymer to form a copolymer, and mechanically blending said prepolymer and said copolymer to yield an intimately blended composition.

The intended resin can be obtained by following any of the foregoing procedures. However, when the graft-polymerization is carried out in two stages as in procedure (2), it was surprisingly found that, as compared with the single-stage procedure, a resin of still higher transparency whose processability was also satisfactory could be obtained. Again, it was found that desirable results were likewise obtained in the case also of procedure (3). As one criterion for indicating the transparency of resins, the haze value is generally used. The smaller this value is, the higher the transparency. While in the case of the invention resin there is some difference depending upon the proportion used of the constituent components, the haze value of the product obtained by the single-stage polymerization procedure is roughly of the order of 20–40%, while in the case of the product obtained by either the hereinbefore described procedure (2) or (3), the haze value is an exceedingly small value of roughly close to 10%. Since the conventional ABS resin is opaque, the measurement of its haze value cannot even be attempted in the first place.

The chlorinated polyethylene, i.e. component (A) of the starting materials to be used in the present invention, is one whose degree of chlorination, i.e. chlorine content, is 15–50% by weight, and preferably 25–45% by weight. In the case the chlorine content is below 15%, the impact strength and transparency of the final product are unsatisfactory, whereas when the chlorine content exceeds 50%, the impact strength declines. Chlorinated polyethylene can be obtained by the known procedure of chlorinating polyethylene which is in solution in a solvent such as chloroform or carbon tetrachloride, or chlorinating an aqueous suspension of finely divided polyethylene at an elevated temperature on the order of 110–135° C. The proportion in which chlorinated polyethylene is to be contained in 100 weight parts of the final product is 5–50 parts by weight, and preferably 15–35 parts by weight. A content of the chlorinated polyethylene of below 5 parts results in a product whose impact strength is low, whereas a content of the chlorinated polyethylene exceeding 50% causes an impairment of the transparency as well as a decline in the tensile strength of the product.

The component (B) of the starting materials to be used in the present invention is a mixture of monomers consisting of (a) 55–85% by weight of methyl methacrylate and (b) 45–15% by weight of styrene. Up to 20% of the percentage accounted for by the methyl methacrylate can be substituted by a lower alkyl acrylate, while up to 15% of the percentage accounted for by the styrene can be substituted by alpha-methylstyrene. As the lower alkyl acrylates, conveniently usable are those in which the alkyl group has 1–4 carbon atoms. The use of the alkyl acrylate is useful in improving the processability of the final resin, while the use of the alpha-methylstyrene increases the heat resistance of the final resin. The percentage of each of the aforesaid monomers is based on the total weight of the component (B). Proportions of the components without the scope defined above are not productive of desirable final products. In the hereinbefore described procedure (2) in which the polymerization reaction is carried out in two stages, the compositions of the component (B) to be used in the first and second stages, i.e. the ratio of the monomers in the mixture of monomers to be used in the two stages, need not necessarily be the same but may be so chosen that the mixture as a whole does not depart from the conditions defined. This likewise applies in the case of procedure (3).

In the present invention the polymerization reaction itself is operated in customary manner. As is well known, the graft-polymerization is carried out either by heating or in the presence of a radical generating polymerization initiator such as an organic peroxide, e.g. benzoyl peroxide, tert.-butyl peroxyacetate and tert.-butyl peroxybenzoate; an azo compound, e.g. azobisisobutyronitrile; or radiant rays. The suspension, solution and bulk polymerization techniques can all be employed, but when the low solubility of chlorinated polyethylene and the ease of controlling the reaction temperature are considered, the suspension polymerization method is the most suitable. As the suspension medium, water is conveniently used with the reaction temperature ranging from about 70° to 200° C.

In conducting the aqueous suspension polymerization reaction, the addition of a dispersant is suitable as is in the case of the customary practice. As dispersants, mention can be made of such, for example, as polyvinyl alcohol, tricalcium phosphate and dodecylbenzene sulfonate. The presence of a substantial amount of a relatively powerful dispersant, e.g. tricalcium phosphate, is required for carrying out the graft-polymerization of the total amount of the component (A) chlorinated polyethylene and the total amount of the component (B) mixture of monomers smoothly in one stage by means of an aqueous suspension system. In contradistinction, when the hereinbefore described two-stage polymerization procedure is employed, the operation can be carried out smoothly without the necessity of conforming with such a requirement. Hence, the two-stage procedure is of great advantage in that not only the resulting resin is of higher transparency but also the polymerization operation is more easily carried out.

The polymerization reaction can be carried out in the presence of the usual molecular weight modifier, for example, tert.-dodecyl mercaptan.

The invention resin can be used directly for molding purposes in its as-obtained state or, if desired, it may be processed after being incorporated with a small amount of the usual plasticizer such as dioctyl phthalate, dibutyl sebacate or butyl benzyl phthalate. However, since the invention resin has good processability, the use of a plasticizer is usually not necessary. Especially, in the case of the resin prepared using the mixture of monomers containing a lower alkyl acrylate, its processing can be readily accomplished without using any plasticizer at all, since it excels in its processability. In molding the invention resin, stabilizers, such as dibutyl tin maleate, colorants and also the conventional fillers can be incorporated as desired.

Since the invention resin not only possesses good transparency but also high impact strength, weatherability, flame resistance and mechanical strengths, it is suitable for molding of appliances, furnitures, building materials as well as a wide variety of other shaped articles.

The following examples are given for further illustration of the invention more specifically.

Examples 1–6 are for illustrating the one-stage polymerization procedure, while Examples 7–16 are for illustrating the two-stage polymerization procedures, including the blending procedure.

The measurement of the properties of the resins obtained was conducted in accordance with the following methods:

Haze value:
    ASTM D1003–52 (specimen thickness 3 mm.)
Impact strength:
    ASTM D256–56 T (notch)
Vicat softening point:
    ASTM D1525–58T
Flow rate:
    Melt indexer:
        200° C., 5 kg. load (Examples 1–6)
        190° C., 10 kg. load (Examples 7–16)
Flame resistance:
    ASTM D635–56T
Weatherability:
    Standard Weather-O-Meter (Black panel temperature 60° or 65°±1° C., water spraying 12 min./60 min., dumbbell-shaped 1-mm. specimen, one-side irradiation)

Abbreviations of the substances used are as follows:

CIPE _____ Chlorinated polyethylene.
MMA _____ Methyl methacrylate.
St _____ Styrene.
αMeSt _____ Alpha-methylstyrene.

EXAMPLE 1

A 1-liter autoclave was charged with 175 ml. of distilled water and, as dispersants, 125 ml. of 2% aqueous polyvinyl alcohol solution, 5 grams of tricalcium phosphate and 0.025 gram of sodium dodecylbenzenesulfonate. Forty grams of ClPE of a degree of chlorination of 40% was then added and stirring of the mixture was carried out at room temperature. An MMA/St (104 g./56 g.) monomeric mixture which had dissolved therein 0.32 gram of t-butyl peroxyacetate as polymerization initiator and 0.48 gram of dodecyl mercaptan as molecular weight modifier was added to the autoclave and, after sweeping the inside of the autoclave with nitrogen, the polymerization reaction was carried out for 4 hours at 105° C. and further for 2 hours at 145° C. The resulting polymer was recovered and, after washing it at 80° C. with aqueous hydrochloric acid solution, it was dried under reduced pressure at 50° C. A polymer of somewhat coarse particulate form was obtained at a yield of 99.5%.

1.5 phr. of dibutyl tin maleate was added to the foregoing polymer which was then kneaded for 10 minutes at 165° C. using rolls. This was then molded with a press at 200° C. to obtain the specimens. The impact strength and haze value were measured using the so obtained specimens with the following results:

Impact strength—6.1 ft.-lb./in. (notch)
Haze value—32%

EXAMPLE 2

The polymerization reaction was operated as in Example 1 except that 50 grams of ClPE (degree of chlorination 30%), 105 grams of MMA, 45 grams of St, 0.15 gram of benzoyl peroxide and 0.48 gram of t-dodecyl mercaptan were used. The yield of the polymer was 99% and its particles were fine. Its impact strength was 12.3 ft.-lb./in. (notch), flow rate was 0.20 g./10 min. and haze value was 41%.

EXAMPLE 3

A 1-liter autoclave was charged with 450 grams of distilled water, 12 grams of tricalcium phosphate, 0.025 gram of sodium dodecylbenzenesulfonate and 1.2 grams of polyvinyl alcohol. Next, 30 grams of ClPE of a degree of chlorination of 40% was added and dispersed. This was followed by adding thereto an MMA/St/methyl acrylate (78 g./36 g./6 g.) monomeric mixture, 0.24 gram of t-butylperoxyacetate and 0.6 gram of t-dodecylmercaptane. After purging the inside of the autoclave with nitrogen, the polymerization reaction was then carried out for 3 hours at 115° C. and for a further 2 hours after raising the temperature to 135° C. The yield of the resulting polymer was 97%.

Using 1.5 phr. of dibutyl tin maleate, the foregoing polymer was kneaded for 5 minutes at 150° C. using rolls, and specimens were made which were tested with the following results:

Haze value—25%
Flow rate—1.14 g./10 min.
Impact strength—8.0 ft.-lb./in. (notch)
Tensile strength—360 kg./cm.²
Vicat softening point (VSP)—95° C.

COMPARISON 1

The properties of a rolled product of a commercially available ABS resin (trade name Cycolac H) was measured with the following results:

Transparency ----- Completely opaque and haze value could not be measured.
Impact strength --- 6.0 ft.-lb./in. (notch).
Flow rate -------- 4.1 g./10 min.
Flame resistance -- Combustible.
Tensile strength --- 350 kg./cm.².

When the weatherability test was conducted at 60° C. on the polymeric composition of Example 3 and the ABS resin, the results were as follows:

| Resin: | Remaining stretch (percent) | | Transparency up to 200 hours |
|---|---|---|---|
| | 100 hours | 200 hours | |
| Example 3 | 95 | 70 | No change. |
| ABS | 22 | 18 | Opaque. |

COMPARISON 2

This experiment shows that either the product obtained is not transparent or its impact strength is low when the proportion in which the starting components are used are without the range specified by the present invention.

(a) When the St in the monomeric mixture exceeds 60%.

The product obtained as in Example 3 using 30 grams of ClPE (degree of chlorination 40%), 78 grams of St, 36 grams of MMA and 6 grams of methyl acrylate has a haze value of 93% and is not transparent.

(b) When the St in the monomeric mixture is 0%.

The product obtained as in Example 3 using 30 grams of ClPE (degree of chlorination 40%), 108 grams of MMA and 12 grams of methyl acrylate has a haze value of 90% and is not transparent.

(c) When the ClPE in the total resin composition is 10% or less.

The product obtained as in Example 3 using 7.5 grams of ClPE (degree of chlorination 40%), 42.8 grams of St, 92.6 grams of MMA, 7.1 grams of methyl acrylate, 0.4 gram of t-dodecyl mercaptan and 0.28 gram of t-butyl peroxyacetate has a haze value of 11%, but its impact strength is 0.54 ft.-lb./in. (notch), a very low value.

EXAMPLE 4

450 grams of distilled water, 12 grams of tricalcium phosphate, 0.025 gram of sodium dodecylbenzenesulfonate, 1.2 grams of polyvinyl alcohol and 30 grams of ClPE of a degree of chlorination of 33% were added to a 1-liter autoclave and dispersed therein. An MMA/St/butyl acrylate (84 g./30 g./6 g.) monomeric mixture which had dissolved therein 0.24 gram of t-butyl peroxyacetate and 0.30 gram of t-dodecyl mercaptan was then added to the autoclave, and the polymerization reaction was carried out as in Example 3. The yield of polymer was 98.5%, and when tested as in Example 3, the results were as follows:

Haze value—30%
Flow rate—0.93 g./10 min.
Impact strength—5.0 ft.-lb./in. (notch)

EXAMPLE 5

37.5 grams of ClPE of a degree of chlorination of 40%, 33.8 grams St, 73.1 grams of MMA, 5.6 grams of methyl acrylate, 0.34 gram of t-dodecyl mercaptan and 0.23 gram of t-butyl peroxyacetate were used, but otherwise the polymerization reaction was carried out as in Example 3. As a result, the yield was 99.5% and the resulting polymer had a haze value of 15.5% impact strength of 12.6 ft.-lb./in. (notch) and a flow rate of 0.50 g./10 min.

EXAMPLE 6

The polymerization reaction was operated as in Example 4 except that 30 grams of ClPE of a degree of chlorination of 40%, 36 grams of St, 72 grams of methyl methacrylate, 12 grams of methyl acrylate, 0.36 gram of t-dodecyl mercaptan and 0.24 gram of t-butyl peroxyacetate were used. As a result, the yield was 99%, and the resulting polymer had a haze value of 29%, impact strength of 5.8 ft.-lb./in. (notch) and flow rate of 1.50 g./10 min.

EXAMPLE 7

A 1-liter autoclave was charged with 360 ml. of pure water and, as dispersant, 1.8 grams of polyvinyl alcohol. 67.2 grams of ClPE of 40% by weight chlorine content and 67.2 grams of an MMA/St. (70/30) monomeric mixture which had dissolved therein 0.20 gram of t-butyl peroxybenzoate as polymerization initiator and 0.23 gram of t-dodecyl mercaptan as molecular weight modifier were then added and stirred. After purging the autoclave with nitrogen, the first stage of the suspension polymerization reaction was carried out for 2.5 hours at 130° C. to form a prepolymer. This was followed by further adding 105.6 grams of an MMA/St (70/30) monomeric mixture which had dissolved therein 0.32 gram of t-butyl peroxybenzoate and 0.37 gram of t-dodecyl mercaptan and thereafter carrying out the second stage of the suspension polymerization reaction for 2.5 hours at 130° C. and one hour at 140° C. The resulting polymer obtained in small bead form was washed with water and vacuum dried for 24 hours at 60° C. The polymer was obtained in an amount of 237.6 grams at a yield of 99%.

1.5 phr. of dibutyl tin maleate, a stabilizer, was added to this polymer and kneaded with rolls for 5 minutes at 160° C. This was then molded with a press at 190° C. to yield specimens whose properties were tested with the following results.

Impact strength—10.5 ft.-lb./in. (notch)
Haze value—9%
Flow rate—0.95 g./10 min.
Vicat softening point—101° C.
Tensile strength—360 kg./cm.²

EXAMPLE 8

A 1-liter autoclave was charged with 400 ml. of pure water and, as dispersants, 12 grams of tricalcium phosphate, 0.08 gram of sodium dodecylbenzenesulfonate and 1.2 grams of polyvinyl alcohol. This was followed by adding to the autoclave 100 grams of ClPE of a degree of chlorination of 30% and 100 grams of an MMA/St (75/25) monomeric mixture which had dissolved therein 0.30 gram of t-butyl peroxybenzoate and 0.45 gram of t-dodecyl mercaptan, followed by stirring. After purging the autoclave with nitrogen, the polymerization reaction was carried out for 3 hours at 120° C. and for a further one hour at 140° C. The prepolymer formed in an amount of 197 grams was washed with aqueous hydrochloric acid solution.

120 grams of the foregoing prepolymer was placed in an autoclave containing 360 ml. of pure water and 1.8 grams of polyvinyl alcohol, and stirred. The autoclave was then charged with 120 grams of an MMA/St (75/25) monomeric mixture which had dissolved therein 0.36 gram of t-butyl peroxybenzoate and 0.54 gram of t-dodecyl mercaptan, after which the second stage polymerization reaction was carried out with the same polymerization cycle as described above, followed by washing and drying the resulting polymer. The yield was 238.2 grams.

The properties of this polymer were measured as in Example 7 with the following results:

Impact strength—11.2 ft.-lb./in. (notch)
Haze value—15%
Flow rate—0.72 g./10 min.

EXAMPLE 9

A polymer was prepared using the same recipe as that of Example 7 except that as the monomer component an MMA/St/ethyl acrylate (65/30/5) mixture was used.

Yield—98.2%
Impact strength—9.7 ft.-lb./in. (notch)
Haze value—10%
Flow rate—1.50 g./10 min.
Tensile strength—335 kg./cm.²
Elongation—85%

EXAMPLE 10

A polymer was prepared using the same recipe as that of Example 7 except that as the monomer component an MMA/St/methyl acrylate (60/30/10) mixture was used.

Yield—97.8%
Impact strength—10.9 ft.-lb./in. (notch)
Haze value—8%
Flow rate—2.84 g./10 min.
Tensile strength—290 kg./cm.²
Elongation—105%

EXAMPLE 11

A 1-liter autoclave containing 400 ml. of pure water, 12 grams of tricalcium phosphate, 0.08 gram of sodium dodecylbenzenesulfonate and 1.2 grams of polyvinyl alcohol was charged with 120 grams of an MMA/St/α-MeSt (70/25/5) mixture which had dissolved therein 0.36 gram of t-butyl peroxybenzoate and 0.42 gram of dodecyl mercaptan, and 80 grams of ClPE of a degree of chlorination of 40%, and then stirred. After purging the autoclave with nitrogen, the polymerization reaction was carried out for 4 hours at 130° C. The resulting prepolymer was washed with aqueous hydrochloric acid solution.

168 grams of this prepolymer was placed in an autoclave containing 300 ml. of pure water and 1.2 grams of polyvinyl alcohol, and stirred. The autoclave was then charged with 72 grams of a monomeric mixture of identical composition as hereinabove noted which had dissolved therein 0.22 gram of t-butyl peroxybenzoate and 0.25 gram of t-dodecyl mercaptan, after which the polymerization reaction was carried out with the same polymerization cycle as noted above, followed by water-washing and drying of the reaction product to obtain 235.9 grams of polymer.

The properties of the polymer were measured as in Example 7 with the following results:

Impact strength—10.5 ft.-lb./in. (notch)
Haze value—9%
Flow rate—0.86 g./10 min.

The properties of a specimen consisting of the foregoing polymer wherein was incorporated 3 phr. of the plasticizer butyl benzyl phthalate were as follows:

Impact strength—10.7 ft.-lb./in. (notch)
Haze value—12%
Flow rate—1.95 g./10 min.

COMPARISON 3

The preparation of polymer was carried out with the same recipe as that used in Example 11 except that ClPE of a degree of chlorination of 5% (Comparison 3–1) and of a degree of chlorination of 52% (Comparison 3–2) were used. The results obtained are shown in the following table. In the case of Comparison 3–1 the impact strength and haze value were both poor, whereas in the case of Comparison 3–2 the impact strength was exceedingly low.

| | Degree of chlorination of ClPE (percent) | Impact strength (ft.-lb./ in. notch) | Haze value (percent) |
|---|---|---|---|
| Comparison: | | | |
| 3–1 | 5 | 0.7 | >90 |
| 3–2 | 52 | 0.6 | 8 |

EXAMPLE 12

A 1-liter autoclave containing 360 ml. of pure water, 3 grams of tricalcium phosphate, 0.015 gram of dodecylbenzenesulfonate and 0.3 gram of polyvinyl alcohol was charged with 240 grams of an MMA/St/α-MeSt (70/25/5) monomeric mixture which had dissolved therein 0.62 gram of t-butyl peroxybenzoate and 0.84 gram of t-dodecyl mercaptan. The polymerization reaction was carried out for 4 hours at 130° C., following which the reaction product was washed with aqueous hydrochloric acid solution, followed by washing with water and drying. 228 grams of small particulate polymer was obtained.

Thirty parts of this polymer and 70 parts of the prepolymer obtained in the first stage of Example 11 were blended with rolls in the presence of 1.5 phr. of dibutyl tin maleate. The properties of the so-obtained composition were as follows:

Impact strength—10.2 ft.-lb./in. (notch)
Haze value—12%
Flow rate—1.01 g./10 min.
Tensile strength—380 kg./cm.²
Elongation—65%

EXAMPLE 13

The polymerization was operated using the same recipe as that of Example 8, except that ClPE of a degree of chlorination of 40% and, as the monomeric component, an MMA/(St+α-MeSt) (70/30) mixture was used. Several classes of polymers were made varying the ratio of α-MeSt in the total monomeric component in a range of 0–15%. The resulting polymers were obtained in all cases at yields exceeding 94% and had impact strengths exceeding 8 ft.-lb./in. (notch). On the other hand, the relationship between the variation in the amounts of the α-MeSt and the corresponding haze values and Vicat softening point (VSP) of the polymers obtained as shown in the following table.

|  | Haze value (percent) | VSP (° C.) |
|---|---|---|
| α-MeSt (percent): | | |
| 0 | 9 | 101 |
| 5 | 8 | 105 |
| 10 | 10 | 110 |
| 15 | 9 | 115 |

COMPARISONS 4–1 TO 4–5

Experiments were conducted using the ClPE and polymerization recipe as described in Example 13 but using monomeric compositions which were either outside the scope of the present invention or of a different class. The results obtained are shown in the following table. The ClPE used in Comparisons 4–3 and 4–5 was however that in which the degree of chlorination was 30%. AN stands for acrylonitrile.

| | Monomeric composition | Impact strength (ft.-lb./in., notch) | Haze value (percent) |
|---|---|---|---|
| Comparison: | | | |
| 4–1 | MMA/St (95/5) | 3.8 | 59 |
| 4–2 | MMA/St (20/80) | 9.8 | >90 |
| 4–3 | AN/St (20/80) | 11.0 | >90 |
| 4–4 | AN/St (70/30) | 10.3 | >90 |
| 4–5 | AN/MMA (30/70) | 6.5 | 53 |

EXAMPLE 14

A polymer was prepared using the same recipe as that of Example 11 except that the monomeric composition used was MMA/methyl acrylate/St/α-MeSt (65/5/20/10). The yield of the polymer was 232 grams.

1.5 phr. of dibutyl tin maleate was added to the foregoing polymer and kneaded at 160° C. using an extruder. The properties of the product upon measurement were as follows:

Impact strength—6.0 ft.-lb./in. (notch)
Haze value—14%
Flow rate—1.47 g./10 min.
Tensile strength—470 kg./cm.$^2$
Elongation—80%
Vicat softening point—105° C.

EXAMPLE 15

A polymer was prepared using the same recipe as that of Example 11 except that as the monomeric composition for the first-stage polymerization reaction a mixture MMA/St/α-MeSt (60/30/10) was used and as the monomeric composition for the second-stage polymerization reaction a mixture MMA/St (75/25) was used. The yield of the polymer was 95% and its properties were as follows:

Impact strength—10.8 ft.-lb./in. (notch)
Haze value—11%
Flow rate—0.71 g./10 min.

EXAMPLE 16

The polymerization reaction was carried out as in Example 11 using a 150-liter autoclave and a composition of the monomeric component of MMA/methyl acrylate/St (65/5/30), the concentration of the dispersants, initiator and molecular weight modifier as well as the polymerization cycle used being identical to those indicated in Example 11. The results obtained were as follows:

Yield—97.8%
Impact strength—9.8 ft.-lb./in. (notch)
Haze value—11%
Flow rate—1.46 g./10 min.

Comparison 5

The properties of a commercial transparent ABS resin, when measured, were as follows:

Impact strength—2.5 ft.-lb./in. (notch)
Haze value—12%

This transparent ABS resin and the polymer obtained in Example 16 were pelletized with an extruder and made into specimens by extrusion molding. When by way of comparison the weatherability of the so-obtained specimens were tested, the following results were obtained.

| | Invention specimen | | ABS specimen | |
|---|---|---|---|---|
| Time of exposure (hr.) | Elongation (percent) | Tensile strength (kg./cm.$^2$) | Elongation (percent) | Tensile strength (kg./cm.$^2$) |
| 0 | 57 | 338 | 51 | 376 |
| 100 | 47 | 343 | 27 | 358 |
| 200 | 44 | 320 | 4 | 267 |
| 300 | 39 | 340 | 4 | 235 |
| 400 | 30 | 355 | 4 | 217 |

What is claimed is:

1. A process for producing a transparent thermoplastic resin having high impact strength which consists essentially of graft-polymerizing
    (A) 5–50 parts by weight of a chlorinated polyethylene having a degree of chlorination of 15–50% by weight with
    (B) 95–50 parts by weight of a mixture of monomers consisting essentially of (a) 55–85% of methylmethacrylate, (b) 0–20% of a lower alkylacrylate, (c) 45–15% of styrene, and (d) 0–15% of α-methylstyrene
and recovering the same.

2. The process according to claim 1 wherein the graft-polymerization is effected in an aqueous suspension at a temperature of 70–200° C. in the presence of a free radical generating polymerization initiator.

3. The process according to claim 1 wherein the graft-polymerization is effected in two stages, the first stage being conducted using the total amount of said (A) component and 30–80% by weight of the total amount of said (B) component to form a prepolymer, followed by the second stage in which the remaining 70–20% by weight of the total amount of said (B) component is polymerized in the presence of said prepolymer.

4. A process for producing a transparent thermoplastic resin having high impact strength which consists essentially of graft-polymerizing
    (A) 5–50 parts by weight of chlorinated polyethylene having a degree of chlorination of 15–50% by weight, and
    (B) 76–15 parts by weight of a mixture of monomers consisting essentially of (a) 55–85% of methylmethacrylate, (b) 0–20% of a lower alkylacrylate, (c) 45–15% of styrene, and (d) 0–15% of α-methylstyrene
to form a prepolymer, separately polymerizing 35–19 parts by weight of a mixture of monomers consisting essentially of (a) 35–85% of methylmethacrylate, (b) 0–20% of a lower alkylacrylate, (c) 45–15% of styrene, and (d) 0–15% of α-methylstyrene, and mechanically blending said prepolymer and said copolymer to form an intimately blended composition.

5. A transparent, high impact strength thermoplastic resin composition consisting essentially of a graft polymer of (A) 5–50 parts by weight of a chlorinated polyethylene having a degree of chlorination of 15–50% by weight with (B) 95–50 parts by weight of a mixture of monomers consisting essentially of (a) 55–85% of methylmethacrylate, (b) 0–20% of a lower alkylacarylate, (c) 45–15% of styrene, and (d) 0–15% of α-methylstyrene.

6. A transparent, high impact strength thermoplastic resin composition consisting essentially of an intimate mixture of (1) a graft polymer of
 (A) 5–50 parts by weight of chlorinated polyethylene having a degree of chlorination of 15–50% by weight, and
 (B) 76–15 parts by weight of a mixture of monomers consisting essentially of (a) 55–85% of methylmethacrylate, (b) 0–20% of a lower alkylacrylate, (c) 45–15% of styrene, and (d) 0–15% of α-methylstyrene; and (2) 19–35 parts by weight of a copolymer consisting essentially of (a) 55–85% of methylmethacrylate, (b) 0–20% of a lower alkylacrylate, (c) 45–15% of styrene, and (d) 0–15% of α-methylstyrene.

References Cited

UNITED STATES PATENTS

| | | | |
|---|---|---|---|
| 3,496,251 | 2/1970 | Takahashi et al. | 260—876 |
| 3,322,857 | 5/1967 | Coaker et al. | 260—876 |

FOREIGN PATENTS

| | | | |
|---|---|---|---|
| 1,046,575 | 10/1966 | Great Britain | 260—878 |

SAMUEL H. BLECH, Primary Examiner

H. ROBERTS, Assistant Examiner

U.S. Cl. X.R.

260—29.6 XA, 878 R